United States Patent [19]
Olson

[11] 4,453,333
[45] Jun. 12, 1984

[54] FISHING LURE

[76] Inventor: Robert W. Olson, 9022 E. 60th, Tulsa, Okla. 74145

[21] Appl. No.: 251,269

[22] Filed: Apr. 6, 1981

[51] Int. Cl.³ .............................................. A01K 85/00
[52] U.S. Cl. ..................................... 43/42.5; 43/42.23
[58] Field of Search .................... 43/42.5, 42.52, 42.51, 43/42.23, 44.81, 42.19, 42.17, 42.18

[56] References Cited

U.S. PATENT DOCUMENTS

| | | | |
|---|---|---|---|
| 1,314,868 | 9/1919 | Gray | 43/42.5 |
| 1,903,558 | 4/1933 | Taylor | 43/42.5 |
| 2,485,448 | 10/1949 | Kennedy | 43/42.52 |
| 2,597,317 | 5/1952 | Gross | 43/42.5 |
| 2,925,681 | 2/1960 | Hughes | 43/42.5 |
| 2,989,817 | 6/1961 | Kepler | 43/44.81 |
| 3,305,964 | 2/1967 | Wieszeck | 43/42.5 |
| 3,762,088 | 10/1973 | Bainton | 43/42.5 |
| 3,896,580 | 7/1975 | Williams, Jr. | 43/42.31 |

FOREIGN PATENT DOCUMENTS 672568 10/1963 Canada .............................. 43/42.23

Primary Examiner—Nicholas P. Godici
Assistant Examiner—Kurt Rowan
Attorney, Agent, or Firm—Head, Johnson & Stevenson

[57] ABSTRACT

A fishing lure comprising a blade member having a general convex cross-sectional configuration, a plurality of eye members secured to the outer convex surface of the blade for selective connection with a fishing line, the peripheral configuration of the blade being substantially irregular egg-shaped with one portion thereof being wider than the longitudinally opposed portion, a ballast member secured to the narrower portion of the blade, and the eye members being disposed in substantial alignment along the longitudinal center line of the blade and spaced inwardly from the periphery of the wider portion thereof whereby the movement of the lure through the water during retrieval thereof is similar to the movement of a kite through the air.

2 Claims, 7 Drawing Figures

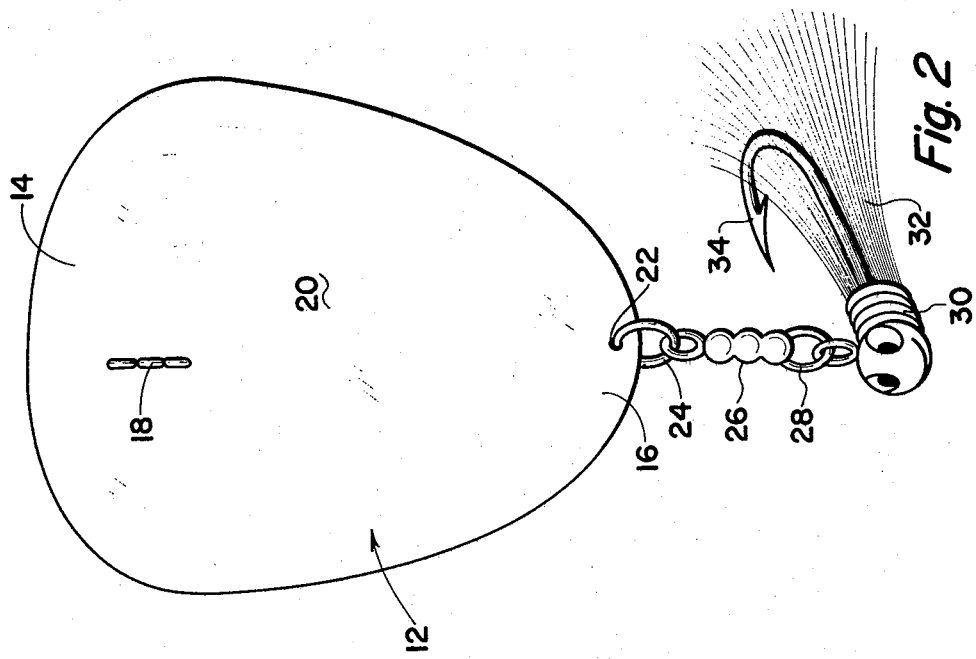
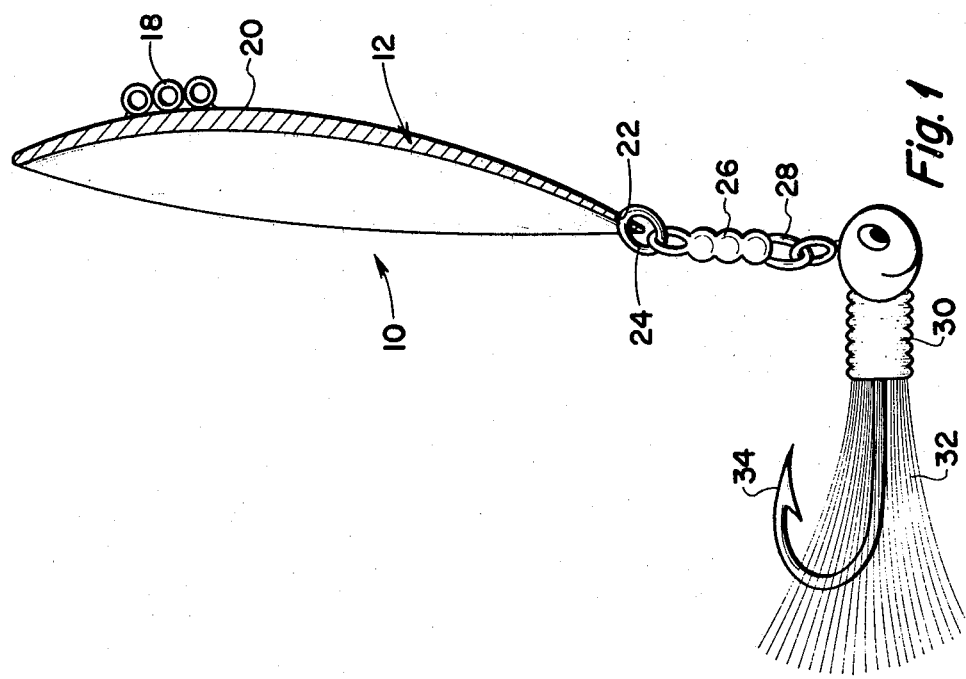

FISHING LURE

BACKGROUND OF THE INVENTION

1. Field of the Invention

This invention relates to improvements in fishing lures and more particularly but not by way of limitation to a spoon or spinner type fishing lure.

2. Description of the Prior Art

Fishing has become quite popular in recent years, and many devices are utilized for attracting fish to the usual hook for facilitating the catching of the fish. Spoon or spinner type lures utilized in combination with the fish hook are in widespread use and are generally successful in that they move somewhat erratically through the water for creating a disturbance for attracting the fish. These spoon or spinner type lures are normally provided with an aperture in the proximity of one longitudinal end of the body for attachment to the usual fishing line and the spoon member is pulled through the water in a substantially horizontally disposed position. Whereas these lures are somewhat effective, the usual fisherman today is constantly in need of a more efficient lure for increasing the results or success of his fishing.

SUMMARY OF THE INVENTION

The present invention contemplates a novel fishing lure of the spoon or spinner type particularly designed and constructed for increasing the action of the lure moving through the water for more efficiently attracting fish to the usual fish hook in association therewith. The novel fishing lure comprises a generally convex body or spinner blade having attachment means provided on the leading face thereon and spaced inwardly of the outer periphery thereof whereby the fishing line is attached or secured to the body in the general manner of the usual or well known kite. Thus, the movement of the lure through the water is generally similar to the movement of a kite through the air. The spinner body or blade oscillates or sways about its own longitudinal axis as it is pulled through the water, creating a great attraction for any surrounding fish. In addition, the generally tilted position of the spinner of oscillating blade catches the light of the sun or atmosphere above the water for casting intermittant light against the usual jig as well as along the path over which the entire lure has moved, further attracting fish. The jig secured to the lower end of the spinner blade is a weighted member. The particular balance design between the line attachment position of the spinner member and the weighted jig member permits the lure to be utilized at or near the surface of the water at a very slow retrieving speed. In addition, this selected balance between the line attachment position and jig or ballast weight provides a gentle side to side swaying motion of the spinner blade and jig as the lure is retrieved through the water. This gentle swaying motion enhances the reflection of the light, producing a very efficient lure for attracting fish. The novel lure is simple and efficient in operation and economical and durable in construction.

BRIEF DESCRIPTION OF THE DRAWINGS

FIG. 1 is a side elevational view, partly in section, of a fishing lure embodying the invention.

FIG. 2 is a front elevational view of a fishing lure embodying the invention.

DETAILED DESCRIPTION OF THE PREFERRED EMBODIMENT

Figure 3:
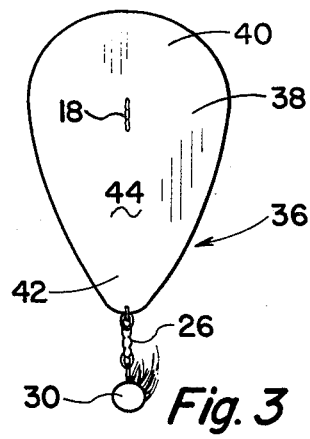
FIG. 3 is a front elevational view of a modified fishing lure embodying the invention.

Referring to the drawings in detail, and particularly FIGS. 1 and 2, reference character 10 generally indicates a fishing lure comprising a spinner blade 12 of a convex configuration and preferably constructed from a chrome plated brass material, colored plastic, or clear plastic with various materials molded therein, but not limited thereto. The peripheral configuration of the blade 12 is an irregular egg-shaped oval, with the upper portion 14 thereof as viewed in FIGS. 1 and 2 being relatively wide or broad and the lower portion 16 thereof being relatively narrow, or of less width than the portion 14. In addition, it is preferable that the cross-sectional thickness of the blade 12 be variable, with the lower portion thereof as viewed in the drawings being somewhat thinner than the central and upper portions thereof. This is particularly shown in FIG. 1.

A plurality of loops or eye members 18 are rigidly secured to the outer convex surface 20 of the blade 12 in any suitable manner, and are preferably disposed in abutting relationship, but not limited thereto. The eye members 18 are disposed in substantial alignment along the longitudinal center line of the blade 12, as shown in FIG. 2, for individual connection with the usual fishing line (not shown) in the normal or well known manner. The provision of a plurality of eye members 18 provides for selective positioning of the connection between the blade 12 and the fishing line in accordance with the desired performance of the lure 10 during use thereof, as will be hereinafter set forth in detail. Of course, it is to be understood that a plurality of bores (not shown) may be provided in the blade 12 in lieu of the eye members 18, if desired, for receiving the fishing line therethrough in order to connect the lure 10 with the fishing line.

A bore 22 is provided in the smaller portion 16 of the blade 12 and is disposed in the proximity of the outer end thereof substantially on the longitudinal center line of the blade. A suitable split ring member 24, or the like, is inserted through the bore 22 in the usual manner for receiving a suitable beaded chain 26, snap swivel (not shown), or the like, thereon. The outer end of the chain 26 is preferably provided with a second split ring member 28 for connection with any suitable ballast member 30. The ballast member 30 may be any suitable weight means, such as a lead head jig means depicted in FIGS. 1 and 2, but not limited thereto. Of course, the jig means 30 may be provided with any suitable or well known dressing 32, such as feathers, hair, rubber or plastic skirts, various well known plastic worms, snakes, eels, fish, shrimp or the like, as desired, and of course, it is normally preferable to include the usual hook means 34 for catching the fish (not shown) during use of the lure 10. In addition, the coloring of the ballast means 30 may be substantially as desired, but it is preferable that the blade 12 be constructed of a suitable reflective material such as chrome plated brass, or the like. Furthermore, the ballast means may be constructed as an integral part of the portion 16 of the blade 12, and provided with a trailer means (not shown) such as an unweighted fly, plastic worm, fish, or the like. It may also be desirable to provide a relatively small centrally disposed projection member (not shown) on the outer periphery of the portion 14 of the blade 12 for producing a ruffling effect at the surface of the water (not shown) during use of the lure 10.

In use, the lure 10 may be secured to the outer end of the usual fishing line (not shown) by attaching the line to one of the eye members 18. This particular positioning of the securing point between the fishing line and blade 12 produces an action through the water generally similar to the action of a kite moving through air. As the line is reeled in during a retrieving of the lure 10, the lure 10 travels high in the water, usually just below the surface thereof. The blade 12 oscillated is a gentle side to side swaying motion for both the blade and the ballast means 30. The blade 12 also reflects light from the atmosphere along the trailing path of the lure for additional attraction of the fish.

Figure 4:
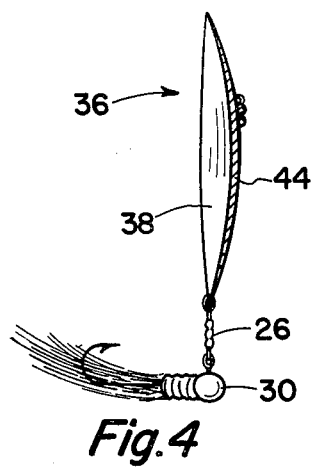
FIG. 4 is a sectional elevational view of the fishing lure shown in FIG. 3.

Referring now to FIGS. 3 and 4, a modified lure 36 is shown which is generally similar to the lure 10, and comprises a blade means 38 of a convex cross-sectional configuration and having an irregular egg-shaped peripheral configuration. The upper portion 40 of the blade 38, as viewed in the drawings, is substantially larger than the lower portion 42 thereof, and the portion 42 is more nearly pointed than the lower portion 16 of the blade 12. A plurality of loop or eye members 44 substantially identical to the eye members 18 are suitably secured to the outer convex surface 44 of the blade 38 and function in the same manner as the eyes 18. The ballast means 30 may be secured to the lower end of the portion 42 in the same manner as hereinbefore set forth and for the same purpose. The cross-sectional thickness of the blade 38 is variable, as particularly shown in FIG. 4, and is preferably thin at both longitudinal ends thereof and thicker in the central portion thereof.

Figure 5:
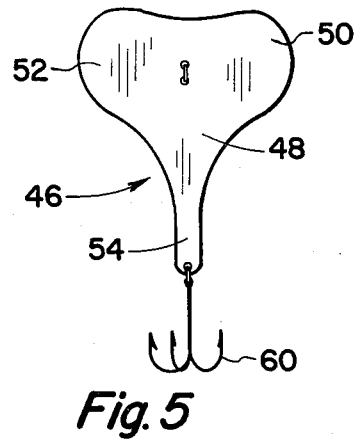
FIG. 5 is a front elevational view of another modified fishing lure embodying the invention.
Figure 6:
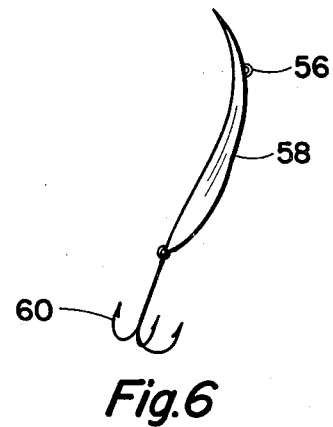
FIG. 6 is a side elevational view of the fishing lure shown in FIG. 5.

Still another modified lure 46 is shown in FIGS. 5 and 6. The lure 46 comprises a blade means 48 having a pair of outwardly extending oppositely disposed ear members 50 and 52 conterminous with a centrally disposed longitudinally extended neck member 54. The cross-sectional configuration of the blade 48 is convex as particularly shown in FIG. 6, and at least one eye or loop member 56 is suitably secured to the outer convex surface 58 of the blade. The eye 56 is disposed substantially on the longitudinal center line of the blade 48, and is spaced inwardly of the outer conjunction between the ears 50 and 52 whereby the fishing line (not shown) may be secured to the blade 48 in the manner as hereinbefore set forth to produce a similar movement for the lure 46 during retrieval thereof as in the case of the lure 10.

Of course, a suitable ballast means, such as the means 30, may be secured to the outer end of the neck 54 in the usual manner, or a suitable fish hook means 60 may be secured thereto in any well known manner.

Figure 7:
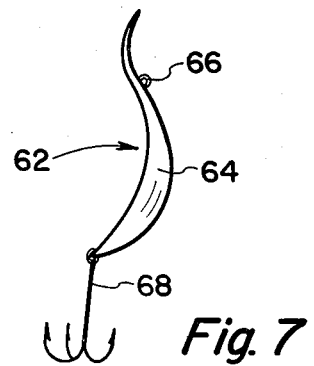
FIG. 7 is a side elevational view of still another fishing lure embodying the invention.

FIG. 7 illustrates still another modified lure 62 comprising a blade member 64 having a generally S-shaped cross-sectional configuration. A loop or eye means 66 is secured to the outer surface of the blade 64 substantially at the juncture between the reverse curves of the S-shape, and disposed substantially on the longitudinal center line of the blade. A suitable ballast means (not shown) may be secured to the lower end of the blade 64, as viewed in FIG. 7, if desired, or suitable hook means 68 may be secured thereto in the usual or well known manner.

Each of the lures 36, 46 and 62 will move through the water in the manner as hereinbefore set forth as the lure is retrieved during a fishing operation. The positioning of the connection between the blade of the lure and the fishing line causes the lure to move through the water in the general manner of a kite moving through air, with the blade moving in a gentle oscillation or side to side movement. Of course, the reflection of the light from the blade also enhances the fish attracting nature of the lure.

As hereinbefore set forth, the provision of the multiple eye members 18 provides optional connection between the blade 12 and the fishing line (not shown). The desired swaying action of the blade 12 moving through the water may be varied in accordance with the optimum required by selecting the particular eye member 18 in combination with the particular weight of the ballast means 30. Thus, the novel fishing lure of the present invention provides an efficient lure for catching fish, and the action of the lure may be varied as required by merely selecting the particular eye member 18 and ballast means 30 to produce the desired results.

Whereas the present invention has been described in particular relation to the drawings attached hereto, it should be understood that other and further modifications, apart from those shown or suggested herein may be made within the spirit and scope of this invention.

What is claimed is:

1. A fish lure for connection to a fishing line and comprising blade means of an elevational configuration including a larger portion smoothly conterminous with a smaller portion and having a substantially convex cross-sectional configuration in a single direction throughout whereby the peripheral configuration of the blade means is substantially an irregular egg-shape having said large portion thereof wider than the longitudinally opposed said smaller portion thereof, outwardly projecting eye means provided on the outer convex surface of the large portion of the blade means and disposed in inwardly spaced relation with respect to the outer peripheral edges of the blade means and along the longitudinal centerline thereof for connection with the fishing line, (and) fish hook means carried by the blade means, fishhook attachment means mounted along the longitudinal centerline of the blade at the peripheral edge of the smaller portion, the spacing of the eye means cooperating with the fishing line to provide a kite-like action for the lure while moving through the water, the eye means comprising a plurality of loop members disposed in substantial alignment along the longitudinal center line of the blade means, and wherein the blade means is of a variable cross-sectional thickness, the cross-sectional thickness being less in the proximity of the fish hook means and increasing in the longitudinal direction away from the hook means and being thickest in the proximity of the eye means.

2. A fish lure as set forth in claim 1 wherein the hook means includes ballast means.

* * * * *